(12) United States Patent
Pinkerton

(10) Patent No.: US 9,641,543 B2
(45) Date of Patent: May 2, 2017

(54) SYSTEMS AND METHODS FOR SECURING REMOTE CONFIGURATION

(71) Applicant: AKTIEBOLAGET SKF, Gothenburg (SE)

(72) Inventor: Alexander Pinkerton, Aberdeen (GB)

(73) Assignee: AKTIEBOLAGET AKF, Gothenburg (SE)

( * ) Notice: Subject to any disclaimer, the term of this patent is extended or adjusted under 35 U.S.C. 154(b) by 10 days.

(21) Appl. No.: 14/693,687

(22) Filed: Apr. 22, 2015

(65) Prior Publication Data
US 2016/0315953 A1    Oct. 27, 2016

(51) Int. Cl.
G06F 11/00 (2006.01)
H04L 29/06 (2006.01)
H04L 12/26 (2006.01)
H04L 12/24 (2006.01)

(52) U.S. Cl.
CPC .......... H04L 63/1416 (2013.01); H04L 41/28 (2013.01); H04L 43/12 (2013.01); H04L 63/123 (2013.01)

(58) Field of Classification Search
CPC .... H04L 63/1416; H04L 43/12; H04L 63/123
See application file for complete search history.

(56) References Cited

U.S. PATENT DOCUMENTS

| 6,564,060 | B1* | 5/2003 | Hoagland | ........... | H04W 76/064 455/450 |
| 2009/0158046 | A1* | 6/2009 | Milliken | ............... | G06F 21/562 713/181 |
| 2015/0200956 | A1* | 7/2015 | Koide | .................... | H04L 43/04 726/22 |

* cited by examiner

Primary Examiner — Mohammed Waliullah
(74) Attorney, Agent, or Firm — Bryan Peckjian; SKF USA Inc. Patent Dept.

(57) ABSTRACT

A system and method for securing remote configurations. The system and method can include, at a monitoring device, connecting to a messaging service for at most a determined connection period. The system and method can also include receiving one or more configuration payloads during the connection period. During the connection, if a single configuration payload is received from the messaging service, the configuration payload can be implemented by the monitoring device after disconnecting from the messaging service. If multiple configuration payloads are received during the connection, then the monitoring device can disconnect from the messaging service and may not implement either configuration payload.

18 Claims, 7 Drawing Sheets

FIG. 5   MESSAGE BROKER

SYSTEMS AND METHODS FOR SECURING REMOTE CONFIGURATION

TECHNICAL FIELD

The present disclosure relates generally to methods, systems, and computer-readable media for securing system configuration via remote devices.

BACKGROUND

Many systems allow for remote configuration based on messages received from remote devices. For example, a machinery monitoring system that monitors operating machinery may be connected to a network and receive configuration instructions via messages from a remote device.

Such systems are susceptible to attack from malicious agents. For example, a malicious user via a remote device could subvert various levels of protection and send a configuration payload to the monitoring system that could compromise the operating machinery. The configuration payload could turn off sensors, change alarm values, change shutdown limits, or otherwise alter important configurations that could lead to the operating machinery becoming damaged or even failing catastrophically, risking the health and safety of persons working near the machinery.

Accordingly, remote configuration systems may benefit from improved security techniques.

SUMMARY

The present disclosure relates generally to methods, systems, and computer readable media for providing these and other improvements to remote configuration systems.

Implementations of the present teachings relate to methods for securing remote configuration. The methods include connecting, at a monitoring device, to a messaging service for at most a determined connection period. During the connection, if a single configuration payload is received from the messaging service, the configuration payload can be implemented by the monitoring device after disconnecting from the messaging service. If multiple configuration payloads are received during the connection, then the monitoring device can disconnect from the messaging service and may not implement either configuration payload.

Implementations of the present teachings relate to computer systems for securing remote configuration, the systems include one or more memory devices storing instructions, and one or more processors coupled to the one or more memory devices. The one or more processors are configured to execute the instructions to perform methods and operations. The methods and operations include connecting, at a monitoring device, to a messaging service for at most a determined connection period. During the connection, if a single configuration payload is received from the messaging service, the configuration payload can be implemented by the monitoring device after disconnecting from the messaging service. If multiple configuration payloads are received during the connection, then the monitoring device can disconnect from the messaging service and may not implement either configuration payload.

Implementations of the present teachings also relate to computer readable storage media storing instructions. The instructions cause one or more processors to perform methods and operations for securing remote configuration. The methods and operations include connecting, at a monitoring device, to a messaging service for at most a determined connection period. During the connection, if a single configuration payload is received from the messaging service, the configuration payload can be implemented by the monitoring device after disconnecting from the messaging service. If multiple configuration payloads are received during the connection, then the monitoring device can disconnect from the messaging service and may not implement either configuration payload.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
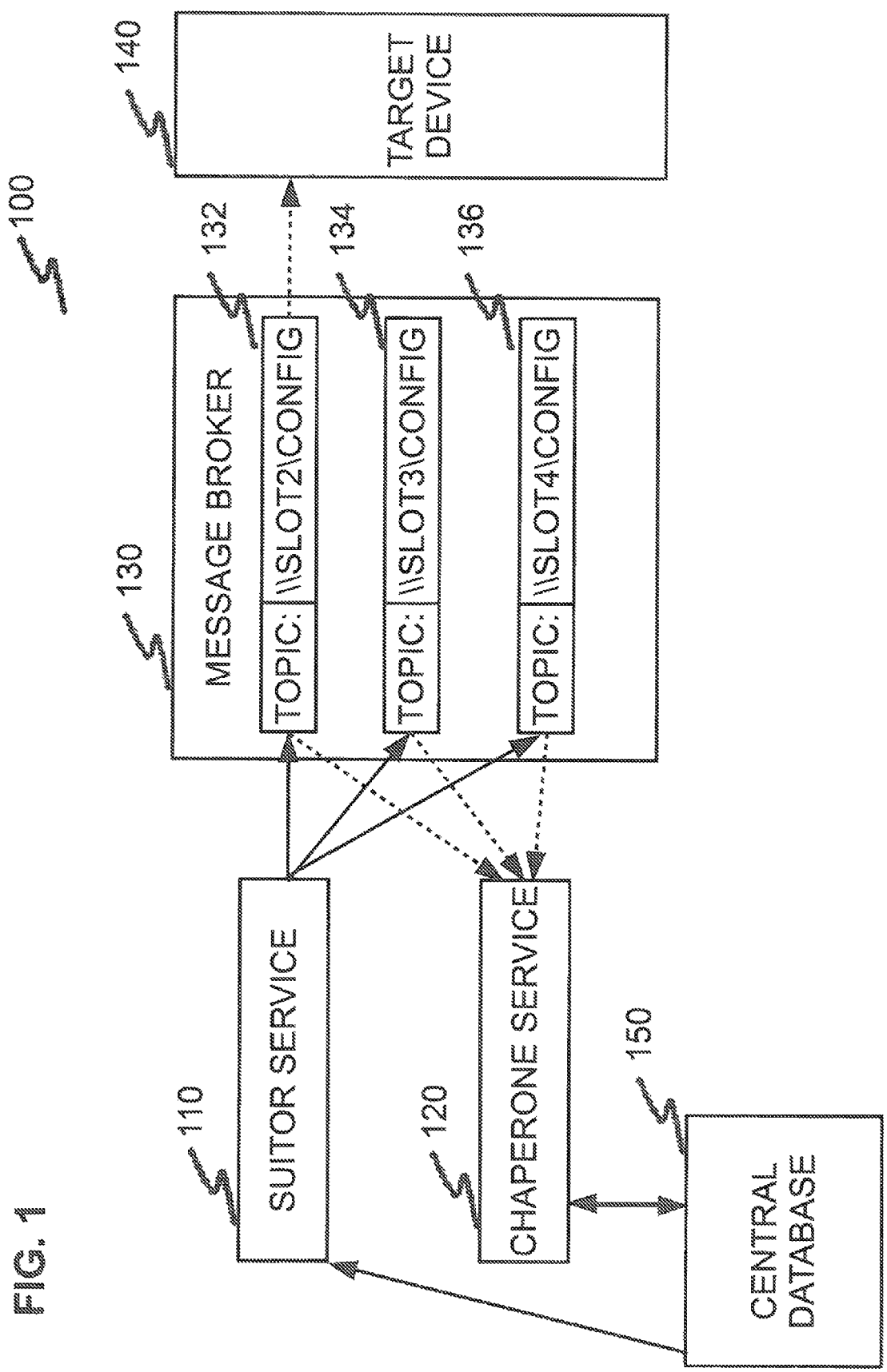
FIG. 1 is a diagram depicting a schematic of an example remote configuration environment, consistent with certain disclosed embodiments.

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a diagram depicting a schematic of an example remote configuration environment, consistent with certain disclosed embodiments. In particular, FIG. 1 depicts an environment 100 that includes a suitor server 110, a chaperone service 120, a message broker 130, a target device 140, and a central database 150.

Suitor service 110 can represent a remote configuration service running on one or more devices. The one or more devices can be any type of computing device capable of communicating with other devices. The one or more devices can be connected to message broker 130 and central database 150 via, for example, a wide area network, such as the internet, a local area network, one or more wireless networks, or a combination thereof. In some embodiments, the one or more devices can additionally be connected to chaperone service 120 (connection not pictured). In some embodiments, suitor service 110 can operate on the same device as central database 150, chaperone service 130, message broker 130, or a combination thereof.

As referred to herein, a suitor service can represent a service that transfers configuration payloads to one or more target devices (e.g., target device 140) by publishing the configuration payload to a message broker (e.g., message broker 130). In some embodiments, suitor service 110 can receive the configuration payload from a central database (e.g., central database 150). Suitor service 110 may then receive instructions (e.g., from a user or from a scheduler) to publish the configuration payload to message broker 130. In other embodiments, suitor service 110 can publish the configuration payload to message broker 130 automatically after it is received from central database 150.

Suitor service 110 can determine where to publish the configuration payload based on, for example, information included in the configuration payload or based on instructions from central database 150. In some embodiments, the configuration payload can include an identifier of target device 140, the message broker associated with target device 140, the topic associated with target device 140, or a combination thereof. Accordingly, if the configuration payload includes an identifier "\\SLOT2\CONFIG," suitor service 110 can determine to publish the configuration payload to topic 132 of message broker 130.

Central database 150 can represent a database running on one or more devices. The one or more devices can be any type of computing device capable of maintaining a database and communicating with other devices. The one or more devices can be connected to suitor service 110 and chaperone service 120 via, for example, a wide area network, such as the internet, a local area network, one or more wireless networks, or a combination thereof. In some embodiments, central database 150 can operate on the same device as suitor service 110, chaperone service 120, message broker 130, or a combination thereof.

As referred to herein, central database 150 can represent a database and/or service that generates or receives configuration payloads, generates and stores configuration payload records, transfers configuration payloads to one or more suitor services (e.g., suitor service 110), and confirms the existence of configuration payload records for one or more chaperone services (e.g., chaperone service 120).

Central database 150 can generate a configuration payload for a target device and a configuration payload record based on, for example, user input (e.g., instructions to configure the target device) and/or a scheduler. The configuration payload can include, for example, an identifier of the message broker topic associated with the target device (e.g., topic 132 "\\SLOT2\CONFIG" for target device 140), a unique identifier of the configuration payload, a timestamp associated with the configuration payload (e.g., when the payload was generated), the payload (e.g., textual configuration instructions, machine code, etc.), an identifier of the target device, and/or an identifier of the message broker associated with the target device (e.g., message broker 130 for target device 140).

In some embodiments, the central database can maintain a record of associations between target devices and message broker topics. For example, when an indication of new target device for remote configuration is added to the central database, an association between the new target device and a topic of a message broker can be stored. Additionally, in further embodiments, when a configuration payload is received by the central database (e.g., from a user at a remote device, from a scheduler, etc.) the configuration payload can be received with an indication of the topic associated with the target device that is the intended recipient of the configuration payload and/or the topic can be part of the configuration payload. In still further embodiments where multiple message brokers are used, an indication of the appropriate message broker can be associated with the target device in the central database, the configuration payload can be received with an indication of the appropriate message broker, the configuration payload can include an indication of the appropriate message broker, etc.

The configuration payload record can include, for example, an identifier of the message broker topic associated with the target device (e.g., topic 132 "\\SLOT2\CONFIG" for target device 140), a unique identifier of the configuration payload, a timestamp associated with the configuration payload (e.g., when the payload was generated), the payload (e.g., textual configuration instructions), an identifier of the target device, an identifier of the message broker associated with the target device (e.g., message broker 130 for target device 140), and a validation code that is not included in the corresponding configuration payload. An example of a validation code can be a Cyclic Redundancy Check (CRC) value computed based on the payload byte content.

The central database 150 can transfer a generated configuration payload to a suitor service associated with the target device (e.g., suitor service 110 for target device 140), which can publish the configuration payload to a message broker (e.g., message broker 130), as described above. Additionally, subsequent to transferring the configuration payload, the central database 150 can receive a request to validate the generated configuration payload from a chaperone service (e.g., chaperone service 120). For example, the request can include a timestamp and a validation code, and the central database can confirm that a configuration payload record exists that is associated with the timestamp and validation code by searching records stored on central database 150. If the existence of the configuration payload record is confirmed, the central database 150 can transfer a validation message to the chaperone service.

Chaperone service 120 can represent a protection service running on one or more devices. The one or more devices can be any type of computing devices capable of generating validation codes and communicating with other devices. The one or more devices can be connected to suitor service 110 (connection not pictured), central database 150, and message broker 130 via, for example, a wide area network, such as the internet, a local area network, one or more wireless networks, or a combination thereof. In some embodiments, chaperone service 120 can operate on the same device as suitor service 110, central database 150, message broker 130, or a combination thereof.

As referred to herein, a chaperone service can represent a service that subscribes to one or more topics of one or more message brokers (e.g. message broker 130 and topics 132, 134, and 136), receives publications from the message brokers, and validates configuration payloads by communicating with one or more central databases (e.g., central database 150).

Chaperone service 120 can subscribe to each topic based on instructions from a user, instructions from a device, an indication from the message broker that a new topic has been added, etc. For example, chaperone service 120 can subscribe to topic 132 ("\\SLOT2\CONFIG"), topic 134 ("\\SLOT3\CONFIG"), and topic 134 ("\\SLOT4\CONFIG") of message broker 130. Accordingly, when suitor service 110 publishes a configuration payload to a topic 132, message broker 130 can push the configuration payload to all subscribers of topic 132, including chaperone serve 120.

In some embodiments, a chaperone service can be synced with a suitor service, such that the chaperone service is subscribed to each topic to which the suitor service can publish.

Once the configuration payload is received by chaperone service 120, the chaperone service 120 can begin validating the configuration payload. For example, chaperone service 120 can extract the timestamp from the configuration payload and/or recalculate the CRC value using the configuration payload. Chaperone service 120 can then transmit a validation request to central database 150 that includes at least one of the timestamp, the CRC value, or the topic that the configuration payload was published to. Because the configuration payload was initially generated at central database 150 and published via suitor service 110, the chaperone service 120 would receive a validation confirmation from central database 150.

Message broker 130 can be a messaging service running on one or more devices. The one or more devices can be any type of computing device capable of communicating with other devices. The one or more devices can be connected to suitor service 110, chaperone service 120, and target device 140 via, for example, a wide area network, such as the internet, a local area network, one or more wireless networks, or a combination thereof. In some embodiments, message broker 130 can operate on the same device as suitor service 110, central database 150, chaperone service 120, or a combination thereof.

As referred to herein, a message broker can represent a service that hosts one or more topics (e.g. topics 132, 134, and 136), receives subscriptions from other devices (e.g., chaperone service 120 and target device 140), receives publications for specified topics (e.g., from suitor service 110), and pushes the publications to devices subscribed to the topic (e.g., chaperone service 120 and target device 140).

Message broker 130 can create topics based on instructions from a user, instructions from a device, etc. In some embodiments, message broker 130 can notify chaperone service 120 whenever a new topic is created and/or whenever a new topic that meets a certain criteria is created.

As an example, message broker 130 can receive a configuration payload as a publication for topic 132 from suitor service 110. Message broker 130 can then push the configuration payload to all devices that are subscribed to topic 132, which, in this example, are chaperone service 120 and target device 140. If a connection is unavailable between message broker 130 and a subscribed device, message broker 130 can reattempt to send the configuration payload to the subscribed device at regular intervals and/or once the connection becomes available. In some embodiments, message broker 130 can be configured so as to only send a configuration payload once to a subscriber. In other words, once a configuration payload is received by a subscriber, message broker 130 may not attempt to push the configuration payload to that subscriber again.

Target device 140 can be one or more devices that monitor and/or control operating machinery. The one or more devices can also include and/or receive information from one or more sensors (e.g., temperature and/or vibration sensors). The one or more devices can be connected to message broker 130 via, for example, a wide area network, such as the internet, a local area network, one or more wireless networks, or a combination thereof.

As referred to herein, a target device can refer to a complete device that monitors or controls operating machinery. Additionally, in some embodiments, a target device can refer to a single element or a subset of configurable elements of a complete device. For example, a first configurable element may be an alarm value and a second configurable element may be a shut off value. Both values may be maintained by a single device, but each configurable element can operate separately and, accordingly, may be referred to as a target device herein.

In some embodiments, target device 140 can connect to message broker 130 at certain intervals and remain connected for a certain period of time. In some implementations, the intervals between connections and/or the periods of connection can be randomly generated within a certain range. For example, intervals between connections can be randomly generated to be between three and ten minutes, and the periods of connection can be randomly generated to be between thirty seconds and two minutes. In other embodiments, the intervals between connections and/or the period of connection can be manually set by a user and/or configured by another device.

Target device 140 may be constrained to receiving configuration payloads from message broker 130 while target device 140 is connected to message broker 130. Target device 140 is connected to message broker 130 when, for example, a network connection between target device 140 and message broker 130 is operational. Target device 140 can disconnect from message broker 130 by shutting down the network connection to message broker 130, shutting down all networking capabilities to target device 140, blocking message from message broker 130, blocking messages via a port that is associated with message broker 130, etc.

Target device 140 may also accept a configuration payload if one configuration payload is received during a period of connection, and may reject a configuration payload otherwise. Target device 140 may store a configuration payload that is received in its cache and wait until the period of connection ends before processing the payload and/or performing any changes to its configurations based on the payload. If target device 140 receives more than one configuration payload during a period of connection, it may clear its cache, including the first received configuration payload, and then close the connection, as discussed further below The example environment depicted in FIG. 1 is merely for the purpose of illustration, and is not intended to be limiting. For example, multiple suitor services, chaperone services, central databases, message brokers, and/or target devices may be included in an environment, consistent with certain disclosed embodiments.

Figure 2:
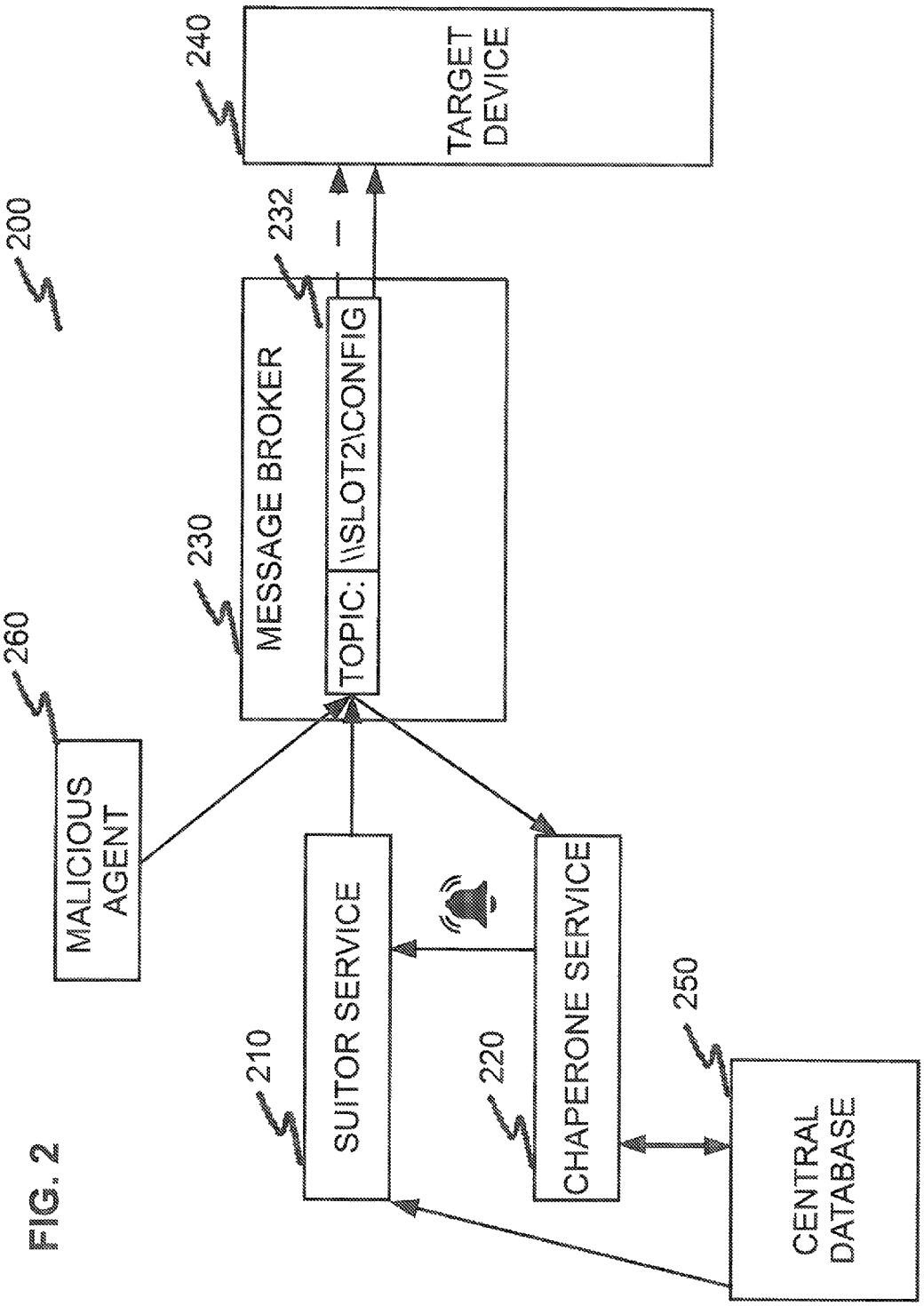
FIG. 2 is a diagram depicting a schematic of an example remote configuration environment with a malicious agent, consistent with certain disclosed embodiments.

FIG. 2 is a diagram depicting a schematic of an example remote configuration environment with a malicious agent, consistent with certain disclosed embodiments. In particular, FIG. 2 depicts an environment 200 that includes a suitor server 210, a chaperone service 220, a message broker 230, a target device 240, a central database 250, and a malicious agent 260.

Malicious agent 260 can represent any type of device that is not authorized to configure target device 240. Malicious agent 260 may attempt to configure target device 240 by publishing a configuration payload to topic 232 on message broker 230. In some embodiments, various protections, such as, for example, Secure Socket Layer (SSL) protections or private authentication by message broker 230 may be in place, and malicious agent 260 may subvert these protections to publish the configuration payload.

Once message broker 230 receives the malicious configuration payload, the message broker 230 can push the malicious configuration payload to subscribers of topic 232, including chaperone service 220. Message broker 230 may also push the malicious configuration payload to target device 240 if the connection between message broker 230 and target device 240 is currently available. Otherwise, message broker 230 may reattempt to push the malicious configuration payload to target device 240 at set intervals or once the connection becomes available.

Once chaperone service 220 receives the malicious configuration payload, the chaperone service 220 can begin validating the configuration payload. For example, the chaperone service 220 can extract the timestamp from the payload and/or calculate the CRC value. The chaperone service 220 can then transmit a validation request to central database 250 that includes at least one of the timestamp, the CRC value, or the topic that the configuration payload was published to. Because the malicious configuration payload was not generated at central database 250, chaperone service 220 can be alerted by central database 250 that the malicious configuration payload is invalid. In some embodiments, chaperone service 220 may then send an alert to suitor service 210 that an invalid configuration payload has been published. In other embodiments, central database 250 may send an alert or an alert configuration payload to suitor service 210. In further embodiments, chaperon service 220 may also send an alert to a system administrator.

In various implementations, an alert configuration payload can be a payload that includes current configuration instructions for target device 240, a payload that includes specific alert instructions, or a payload that includes any other type of information. As discussed in further detail below, target device 240 may not implement payloads received if more than one configuration payload is received during a connection period. Accordingly, because an alert configuration payload is not used to configure the target device, in some embodiments, the actual content of the payload may be irrelevant as long as it is eventually pushed to target device 240 during the same connection period that the invalid configuration payload is received. In other embodiments, the alert configuration payload may be used to overwrite the invalid configuration payload at message broker 230 prior to message broker 230 pushing the configuration payload to target device 240. Accordingly, in such embodiments, the alert configuration payload can include current configuration instructions for target device 240.

Once suitor service 210 receives either an alert from chaperone service 220 or an alert configuration payload from central database 250, suitor service 210 can publish an alert configuration payload to topic 232 of message broker 230. The alert configuration payload can be generated by the suitor service 210 or received from central database 250.

Once the alert configuration payload is published, message broker can push the alert configuration payload to all subscribers of topic 232. In some embodiments, if message broker 230 was not able to send the invalid configuration payload before receiving the alert configuration payload, it can send both payloads to target device 240 once the connection is available. In other embodiments, message broker 230 may overwrite and/or perform no further attempts to publish the invalid configuration payload once a new configuration payload is received for a topic. Accordingly, in such embodiments, the alert configuration payload may be pushed to target device 240 once the connection is available and the malicious configuration payload may not be pushed to target device 240.

If message broker 230 already sent the invalid configuration payload to target device 240, the message broker 230 may send the alert configuration payload to target device 240 once it is received.

In some embodiments, target device 240 may receive both an invalid configuration payload and an alert configuration payload during the same period of connection and both payloads can be stored in cache and not implemented. In response to receiving more than one configuration payload during the same period of connection, target device 240 can clear its cache upon receipt of the second configuration payload and close the connection to message broker 230. Accordingly, the configurations in the invalid configuration payload may not be implemented.

In some embodiments, in the event that malicious agent 260 publishes an invalid configuration payload during a connection period of target device 240 where a valid configuration payload was already received, target device 240 may receive both payloads and both payloads can be stored in cache and not implemented. In response to receiving more than one configuration payload during the same period of connection, target device 240 can clear its cache upon receipt of the second configuration payload and close the connection to message broker 230. Accordingly, the configurations in the invalid configuration payload may not be implemented.

The subsequent invalid configuration payload can also be pushed by message broker 230 to chaperone service 220. Accordingly, chaperone service 220 can take appropriate action. For example, chaperone service 220 can instruct one of central database 250 or suitor service 210 to republish the valid configuration payload during the next connection period of target device 240.

The example environment depicted in FIG. 2 is merely for the purpose of illustration, and is not intended to be limiting. For example, multiple suitor services, chaperone services, central databases, message brokers, target devices, and/or malicious agents may be included in an environment, consistent with certain disclosed embodiments.

Figure 3:
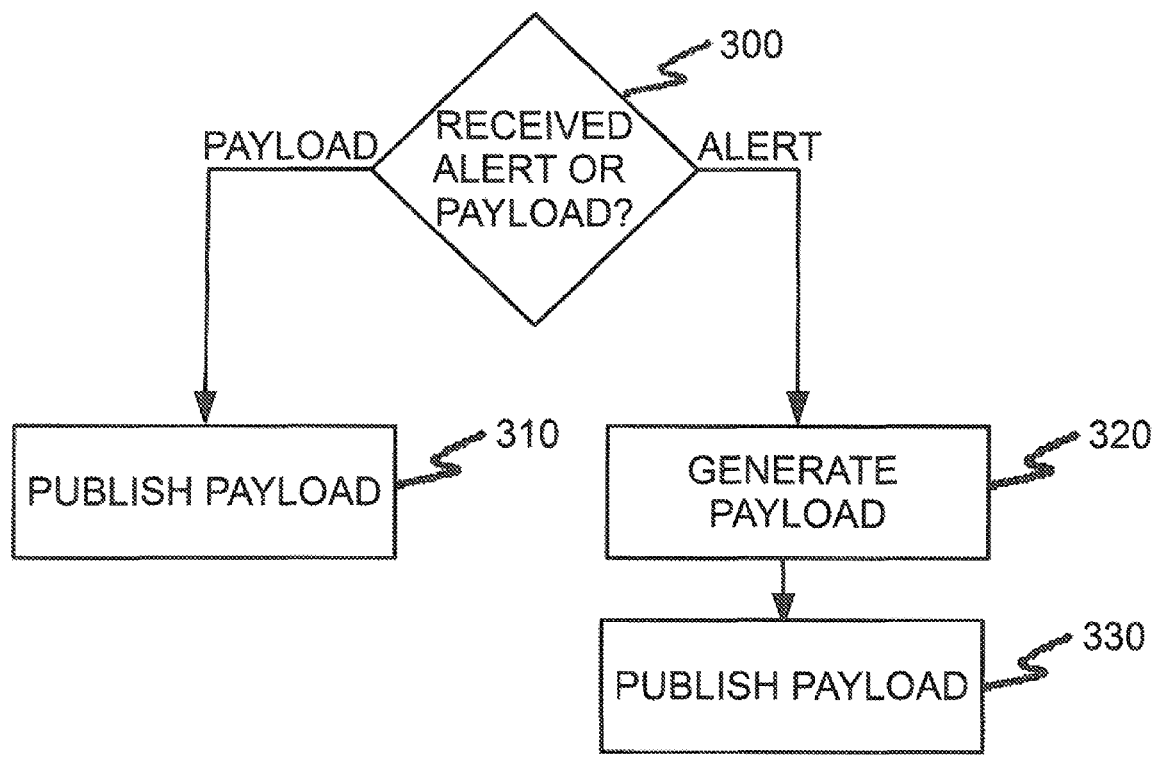
FIG. 3 is a flow diagram illustrating an example method performed by a remote configuration service, consistent with certain disclosed embodiments.

FIG. 3 is a flow diagram illustrating example methods performed by a remote configuration service, consistent with certain disclosed embodiments. The remote configuration service can be performed by a computing device and can be, for example, suitor service 110 or suitor service 210, as discussed above in regard to FIGS. 1 and 2.

The process can begin in 300 when a configuration payload or an alert is received by the computing device. If a configuration payload is received in 300, the computing device can proceed to 310 and publish the payload by transferring the payload to a message broker (e.g., message broker 130 or message broker 230).

In some embodiments, the configuration payload can be received from a central database (e.g., central database 150 or central database 250) and can represent a legitimate configuration payload intended for a target device (e.g. target device 140 or target device 240). In other embodiments, the configuration payload can be received from the central database or from a chaperone service (e.g., chaperone service 120 or chaperone service 220) and can represent an alert configuration payload that is intended to force the target device to clear its cache and not implement any configuration payloads that were received during its current period of connection.

If an alert is received in 300, the computing device can proceed to 320 and generate an alert configuration payload. In some embodiments, the computing device can generate a configuration payload with blank, random, or any other type of placeholder information. In other embodiments, the computing device can generate a configuration payload by utilizing a preexisting configuration payload that is stored on the computing device and intended for use after receiving an alert. In further embodiments, the computing device can generate a configuration payload using a configuration payload record representing a current configuration payload that is stored on the computing device or from information requested from a central database.

In 330, the computing device can publish the alert configuration payload by transferring the alert configuration payload to a message broker.

While the steps depicted in FIG. 3 have been described as performed in a particular order, the order described is merely exemplary, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 4:
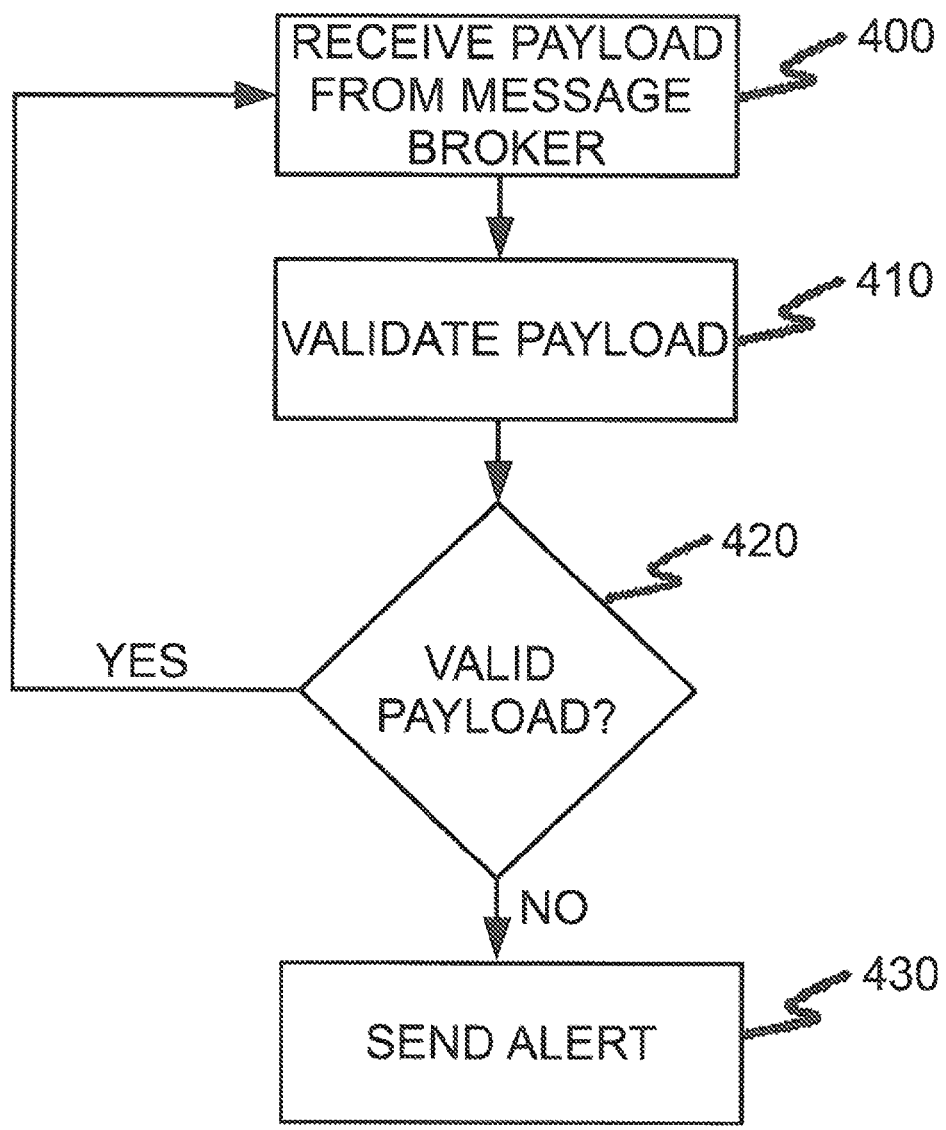
FIG. 4 is a flow diagram illustrating an example method performed by a protection service, consistent with certain disclosed embodiments.

FIG. 4 is a flow diagram illustrating an example method performed by a protection service, consistent with certain disclosed embodiments. The protection service can be performed by a computing device and can be, for example, chaperone service 120 or chaperone service 220, as discussed above in regard to FIGS. 1 and 2.

The process can begin in 400 when a configuration payload is received by the computing device from a message broker. In some embodiments, the computing device can be subscribed to multiple topics of the message broker and/or to topics of multiple message brokers.

In 410, the computing device can validate the configuration payload. For example, the computing device can extract a timestamp from the configuration payload and/or calculate the CRC value of the payload. In some embodiments, the computing device can transmit a validation request to a central database (e.g., central database 150 or central database 250), and the validation request can include at least one of the timestamp, the CRC value, or the topic that the configuration payload was published to.

In 420, based on a response received from the central database, the computing device can determine whether the configuration payload is valid. If the configuration payload is valid, the computing device can proceed back to 400 when the next configuration payload is received. If the configuration payload is not valid, the computing device can proceed to 430.

In 430, the computing device can send an alert in response to the configuration payload not being valid. In some embodiments, the computing device can send the alert to a suitor service. For example, the computing device can determine the intended target device of configuration payload that is not valid. The computing device can then determine a suitor service that is associated with the intended target device (e.g., the central database can include an indication of the suitor service associated with the intended target device) and transmit the alert that an invalid configuration payload has been sent to the target device, and the suitor service can take appropriate action, as disclosed herein.

While the steps depicted in FIG. 4 have been described as performed in a particular order, the order described is merely exemplary, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 5:
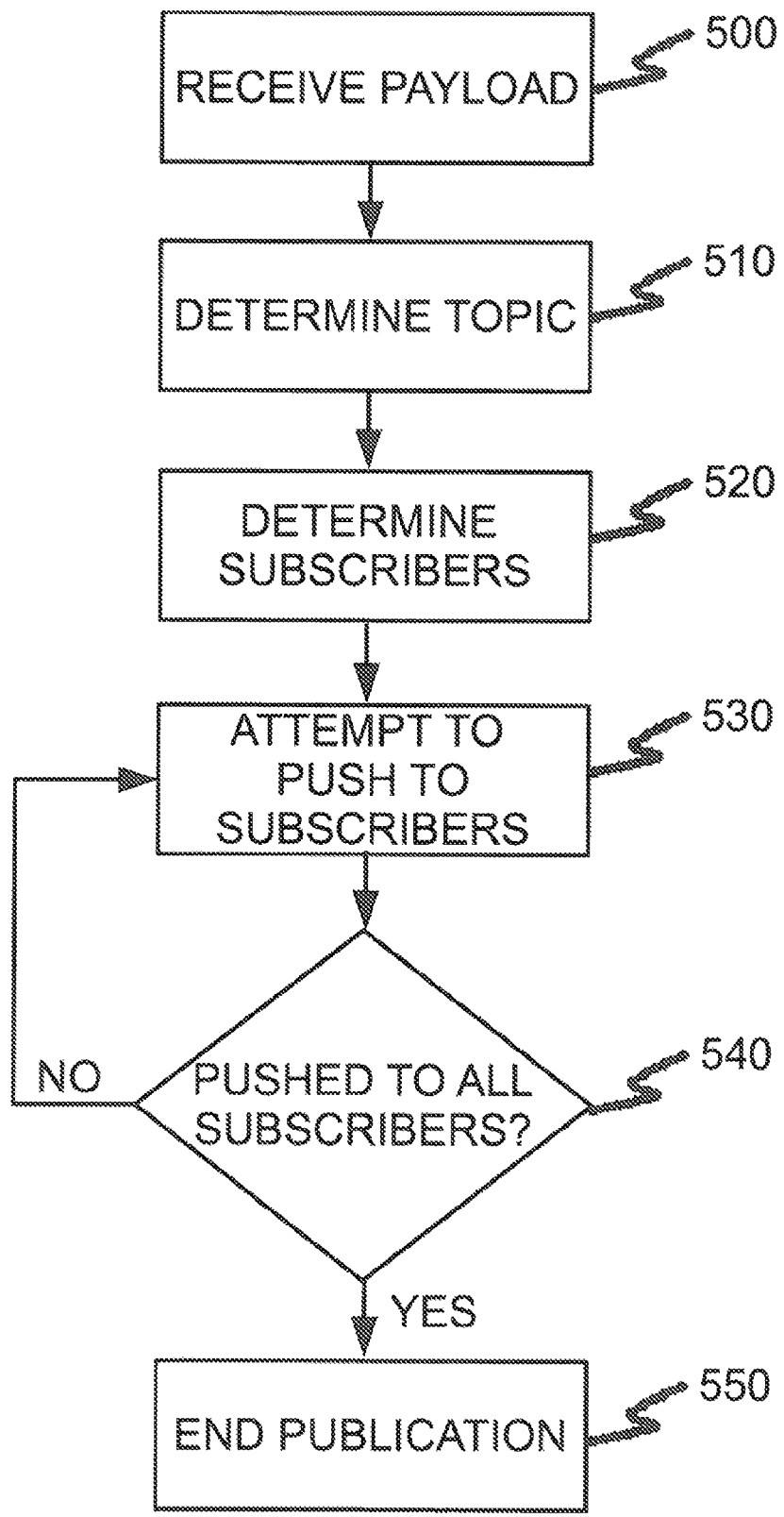
FIG. 5 is a flow diagram illustrating an example method performed by a messaging service, consistent with certain disclosed embodiments.

FIG. 5 is a flow diagram illustrating an example method performed by a messaging service, consistent with certain disclosed embodiments. The messaging service can be performed by a computing device and can be, for example, message broker 130 or message broker 230, as discussed above in regard to FIGS. 1 and 2.

The process can begin in 500 when a configuration payload is received by the computing device. In 510, the computing device can determine a topic corresponding to the configuration payload. For example, the computing device can extract the topic from the configuration payload, receive a separate indication of topic from the sender, etc. The topic can be, for example, a textual string, and the computing device can determine whether a topic exists with a name that is an exact match or a near match of the text string. If no match is found, the configuration payload can be ignored and/or deleted, an error message can be sent to the sender, the message can be transferred to a different message broker, etc.

In 520, the computing device can determine subscribers of the topic determined in 510. For example, the computing device can maintain a list of Internet Protocol (IP) addresses of each device that is subscribed to a topic.

In 530, the computing device can attempt to push (i.e., transfer without requiring a request) the configuration payload to each subscriber.

In 540, the computing device can determine if the configuration payload was successfully pushed to each subscriber. For example, the computing device can attempt to connect to each subscriber in 530, push the configuration payload when a connection is made, and determine that the push was unsuccessful if the connection is not made (e.g., the connection attempt times out). If, in 540, the computing device determines that the configuration payload was not successfully pushed to each subscriber, it can return to 530 and attempt to push the configuration payload to the remaining subscribers.

In some embodiments, if the computing device has not pushed the configuration payload to all subscribers but receives a new configuration payload for the same topic, the computing device can stop attempting to push the original configuration payload to subscribers and return to 530 and attempt to push the new configuration payload to all subscribers. Accordingly, if the original configuration payload was an invalid configuration payload, it may not be sent to the target device. In other embodiments, the computing device can end publication after receiving the new configuration payload and may not attempt to send the original or the new configuration payload to subscribers. Accordingly, if the original configuration payload, the new configuration payload, or both are invalid configuration payloads, they may not be sent to the target device.

If, in 540, the computing device determines that the configuration payload was successfully pushed to each subscriber, it can proceed to 550, and the publication for that configuration payload is complete. In some embodiments, in 550, the computing device can delete the configuration payload, while, in other embodiments, the computing device can archive or otherwise store the published configuration payload.

While the steps depicted in FIG. 5 have been described as performed in a particular order, the order described is merely exemplary, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 6:
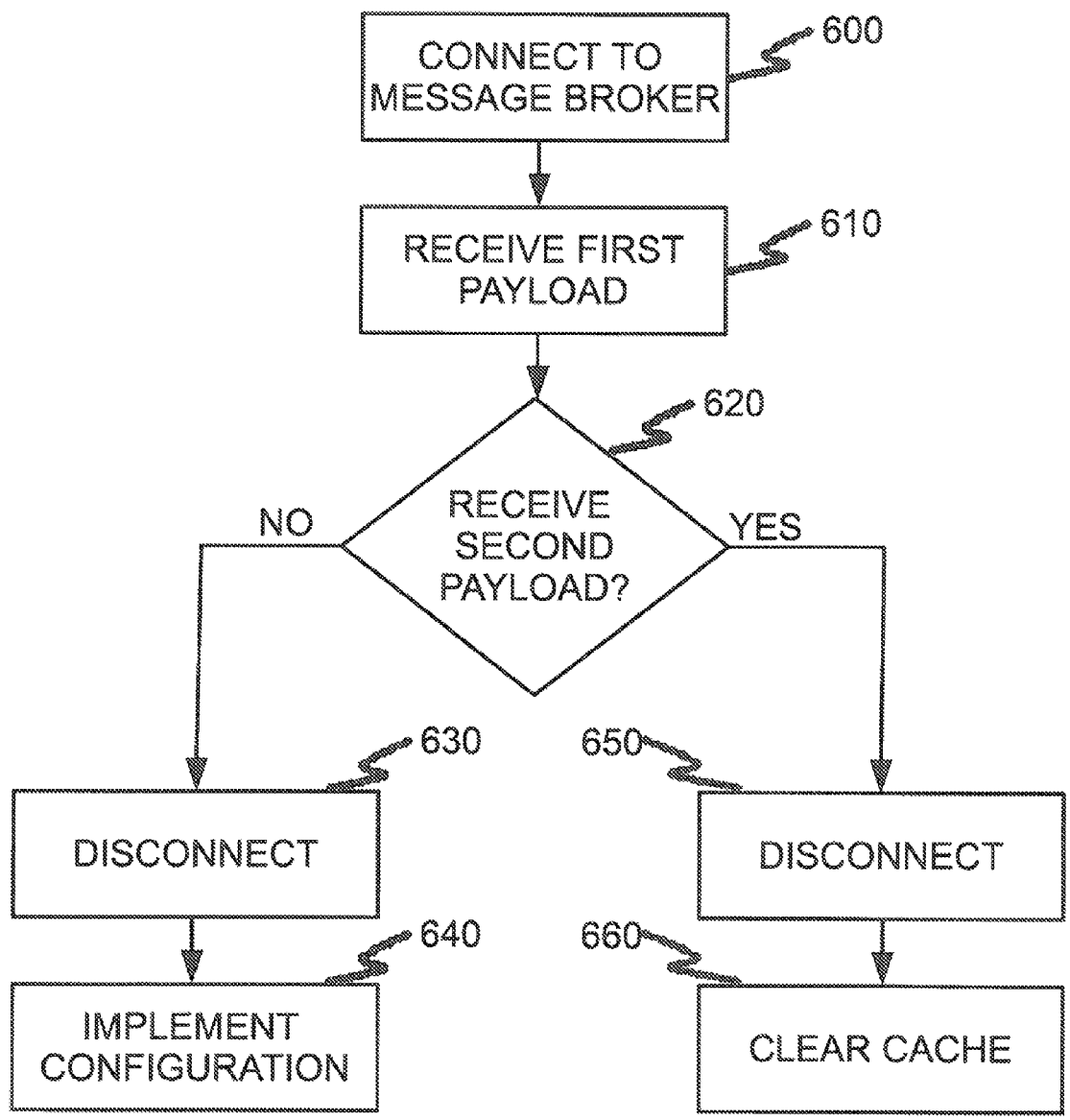
FIG. 6 is a flow diagram illustrating an example method performed by a target device capable of being remotely configured, consistent with certain disclosed embodiments.

FIG. 6 is a flow diagram illustrating an example method performed by a target device capable of being remotely configured, consistent with certain disclosed embodiments. The target device can be a computing device and can be, for example, target device 140 or target device 240, as discussed above in regard to FIGS. 1 and 2.

The process can begin in 600 when the target device connects to a message broker (e.g. message broker 130 or 230). The target device can connect to the message broker at certain intervals and remain connected for a certain period of time. In some embodiments, the intervals between connections and/or the periods of connection can be randomly generated within a certain range. For example, a range between three and ten minutes can be specified for the intervals between connections. Accordingly, the target device can use a random number generator to determine a random interval between three and ten minutes. After a previous disconnection, the target device can wait for the determined random interval before establishing a new connection to the message broker. Similarly, for example, a range between 30 seconds and two minutes can be specified for periods of connection. Accordingly, the target device can use the random number generator to determine a random period of connection between 30 seconds and two minutes. After establishing a connection, the target device can wait no longer than the determined random period of connection before disconnecting from the message broker, as discussed further below.

In other embodiments, the intervals between connections and/or the period of connection can be manually set by a user and/or configured by another device.

In 610, the target device can receive a first configuration payload from the message broker after connecting in 600 and before disconnecting. The target device can store the first configuration payload in its cache and may not implement the configurations or otherwise process the configuration payload.

If, in 620 a second configuration payload is received from the message broker after connecting in 600 and before disconnecting, the process can proceed to 650. Otherwise, once the period of connection ends and no second configuration payload is received, the process can proceed to 630.

In 630, once the period of connection ends, the target device can disconnect from the message broker. Then, in 640, because only one configuration payload was received, the target device can implement the configurations in the first configuration payload. For example, the target device can be monitoring one or more operating machinery, and the target device can turn off sensors, change alarm values, change shutdown limits, etc. that are used in monitoring the operating machinery. As an additional example, the target device can represent a configurable element of a complete device, and complete device can implement the configurations in the first configuration payload for the configurable element.

In some embodiments, as an additionally security measure, the target device may only implement the first configuration payload after performing its own internal confirmation checks on validity.

Alternatively, in 650, the target device can disconnect from the message broker after receiving the second payload. In some embodiments, the target device can disconnect in response to receiving the second payload and/or prior to the end of the period of connection. Additionally, in response to receiving the second payload, the target device can clear its cache, which can include deleting the first configuration payload and deleting the second configuration payload. Accordingly, neither configuration payload is implemented.

While the actions depicted in FIG. 6 have been described as performed in a particular order, the order described is merely exemplary, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 7:
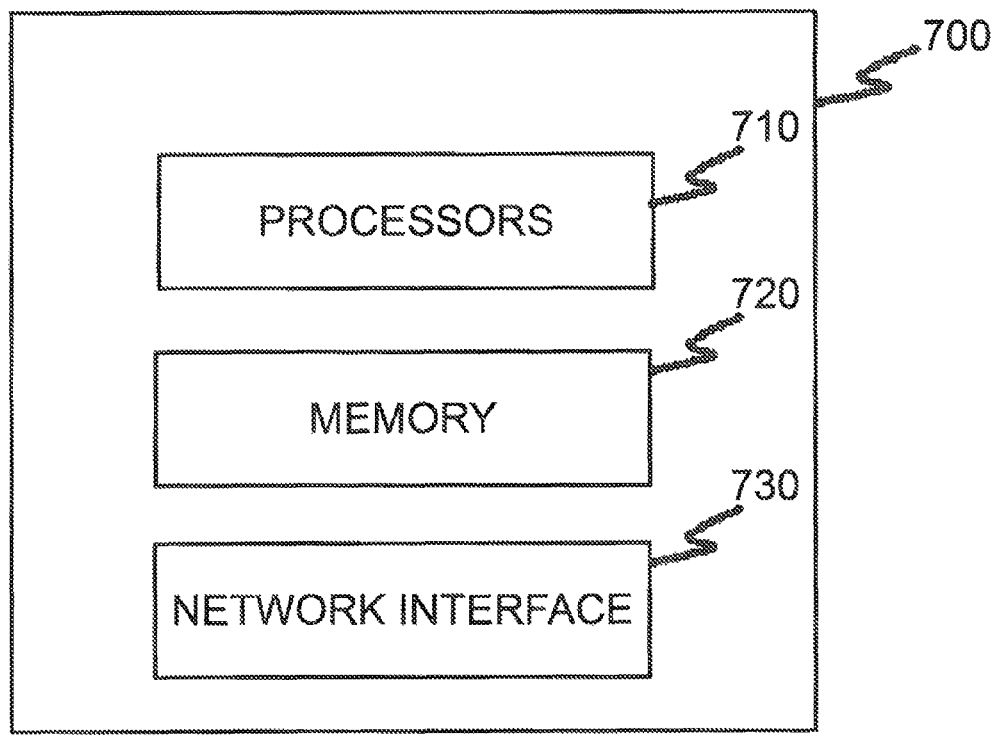
FIG. 7 is a diagram illustrating an exemplary hardware system for securing systems that allow remote configuration, consistent with certain disclosed embodiments.

FIG. 7 is a diagram illustrating a hardware system for securing systems that allow remote configuration, consistent with certain disclosed embodiments. Computing device 700 may represent any type of one or more computing devices. For example, computing device 700 can represent a computing device that performs a suitor service (e.g., 110 or 210) or a chaperone service (e.g., 120 or 220), a central database (e.g., 150 or 250), a message broker (e.g., 130 or 230), and/or a target device (e.g., 140 or 240).

Computing device 700 may include, for example, one or more microprocessors 710 of varying core configurations and clock frequencies; one or more memory devices or computer-readable media 720 of varying physical dimensions and storage capacities, such as flash drives, hard drives, random access memory, etc., for storing data, such as images, files, and program instructions for execution by one or more microprocessors 710; etc. Computing device 700 may also include a network interface 730 for communicating with other devices via, for example, a wide area network, such as the internet, a local area network, a telecommunications network, or a combination thereof. One or more microprocessors 710, one or more memory devices or computer-readable media 720, and network interface 730 may be part of a single device as disclosed in FIG. 7 or may be contained within multiple devices. Those skilled in the art will appreciate that the above-described componentry is exemplary only, as computing device 700 may comprise any type of hardware componentry, including any necessary accompanying firmware or software, for performing the disclosed embodiments.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method for securing remote configuration comprising:
   at a monitoring device, connecting to a messaging service for a connection period;
   while connected to the messaging service for the connection period:
      receiving a configuration payload from the messaging service; and
      receiving a subsequent configuration payload from the messaging service;
   disconnecting from the messaging service, wherein, in response to receiving a plurality of configuration payloads during the connection period, the configuration payload and the subsequent configuration payload are not implemented by the monitoring device;
   connecting to the messaging service for a second connection period;
   while connected to the messaging service for the second connection period, receiving a third configuration payload from the messaging service; and
   disconnecting from the messaging service at the end of the second connection period.

2. The method of claim 1, further comprising:
   in response to receiving only one configuration payload during the second connection period, implementing the third configuration payload by altering configuration parameters for monitoring of one or more operating machinery based on the third configuration payload.

3. The method of claim 1, wherein the third configuration payload is a legitimate configuration payload and is from a remote configuration service.

4. The method of claim 1, further comprising, while connected to the messaging service for the connection period:
   storing the configuration payload and the subsequent configuration payload in a cache of the monitoring device.

5. The method of claim 4, further comprising:
   clearing the cache of the monitoring device in response to receiving a plurality of configuration payloads.

6. The method of claim 1, wherein:
   the configuration payload is from a malicious agent;
   a protection service determined that the configuration payload was not legitimate; and
   the subsequent configuration payload was sent by a remote configuration service based on the protection service determining that the configuration payload was not legitimate.

7. The method of claim 1, wherein the subsequent configuration payload is from a malicious agent.

8. The method of claim 1, further comprising:
   determining an interval between connections;
   disconnecting from a previous connection;
   determining a time equal to the interval between connections has elapsed since disconnecting form the previous connection; and
   wherein connecting to the messaging service for the connection period is in response to determining that the time equal to the interval between connections has elapsed.

9. The method of claim 8, wherein at least one of the interval between connections and the connection period are randomly generated.

10. A system for securing remote configuration comprising:
    a processing system, at a monitoring device, comprising one or more processors; and
    a memory system comprising one or more computer-readable media, wherein the one or more computer-readable media contain instructions that, when executed by the processing system, cause the processing system to perform operations comprising:
       connecting to a messaging service for a connection period;
       while connected to the messaging service for the connection period:
          receiving a configuration payload from the messaging service; and
          receiving a subsequent configuration payload from the messaging service;
       disconnecting from the messaging service, wherein, in response to receiving a plurality of configuration payloads during the connection period, the configuration payload and the subsequent configuration payload are not implemented by the monitoring device;
       connecting to the messaging service for a second connection period;
       while connected to the messaging service for the second connection period, receiving a third configuration payload from the messaging service; and
       disconnecting from the messaging service at the end of the second connection period.

11. The system of claim 10, the operations further comprising:
    in response to receiving only one configuration payload during the second connection period, implementing the third configuration payload by altering configuration parameters for monitoring of one or more operating machinery based on the third configuration payload.

12. The system of claim 10, wherein the third configuration payload is a legitimate configuration payload and is from a remote configuration service.

13. The system of claim 10, the operations further comprising, while connected to the messaging service for the connection period:
    storing the configuration payload and the subsequent configuration payload in a cache of the monitoring device.

14. The system of claim 13, the operations further comprising:
    clearing the cache of the monitoring device in response to receiving a plurality of configuration payloads.

15. The system of claim 10, wherein:
    the configuration payload is from a malicious agent;
    a protection service determined that the configuration payload was not legitimate; and
    the subsequent configuration payload was sent by a remote configuration service based on the protection service determining that the configuration payload was not legitimate.

16. The system of claim 10, wherein the subsequent configuration payload is from a malicious agent.

17. The system of claim 10, the operations further comprising:
    determining an interval between connections;
    disconnecting from a previous connection;
    determining a time equal to the interval between connections has elapsed since disconnecting form the previous connection; and wherein connecting to the messaging service for the connection period is in response to determining that the time equal to the interval between connections has elapsed.

18. The system of claim 17, wherein at least one of the interval between connections and the connection period are randomly generated.

* * * * *